United States Patent
Kokubo et al.

[15] 3,700,672
[45] Oct. 24, 1972

[54] PROCESS FOR RECOVERING BY-PRODUCT GASES AT HIGH PRESSURE IN MELAMINE PRODUCTION

[72] Inventors: Ryo Kokubo; Yasuo Takakuwa; Akihiro Shiroishi; Mitsuji Kihara, all of Fuchumachi, Neigun, Japan

[73] Assignee: Nissan Kagaku Kogyo Kabushiki Kaisha, Tokyo, Japan

[22] Filed: April 15, 1969

[21] Appl. No.: 816,331

[52] U.S. Cl.........................260/249.7 P, 260/555 A
[51] Int. Cl. ..............................................C07d 55/24
[58] Field of Search..................260/249.7 A, 249.7 P

[56] References Cited
UNITED STATES PATENTS

| | | | |
|---|---|---|---|
| 3,470,163 | 9/1969 | Hazelton | 260/249.7 |
| 3,578,664 | 6/1969 | Kaasenbrood | 260/249.7 |
| 2,776,285 | 1/1957 | Dyer | 260/249.7 |
| 3,458,511 | 7/1969 | Hamprecht et al. | 260/249.7 |
| 3,503,970 | 3/1970 | Kanai et al. | 260/249.7 |

Primary Examiner—John M. Ford
Attorney—Holcombe, Wetherill & Brisebois

[57] ABSTRACT

In the process of producing melamine by the thermal decomposition of urea or its derivatives, an improved method for separating the molten material (composed mainly of melamine formed in a pressurized reactor) from the gases (composed mainly of ammonia and carbon dioxide) under nearly the same conditions as prevail in said reactor, and for recovering the by-product gases as pressurized by-product gases, with the crude liquid melamine eliminated therefrom.

8 Claims, 1 Drawing Figure

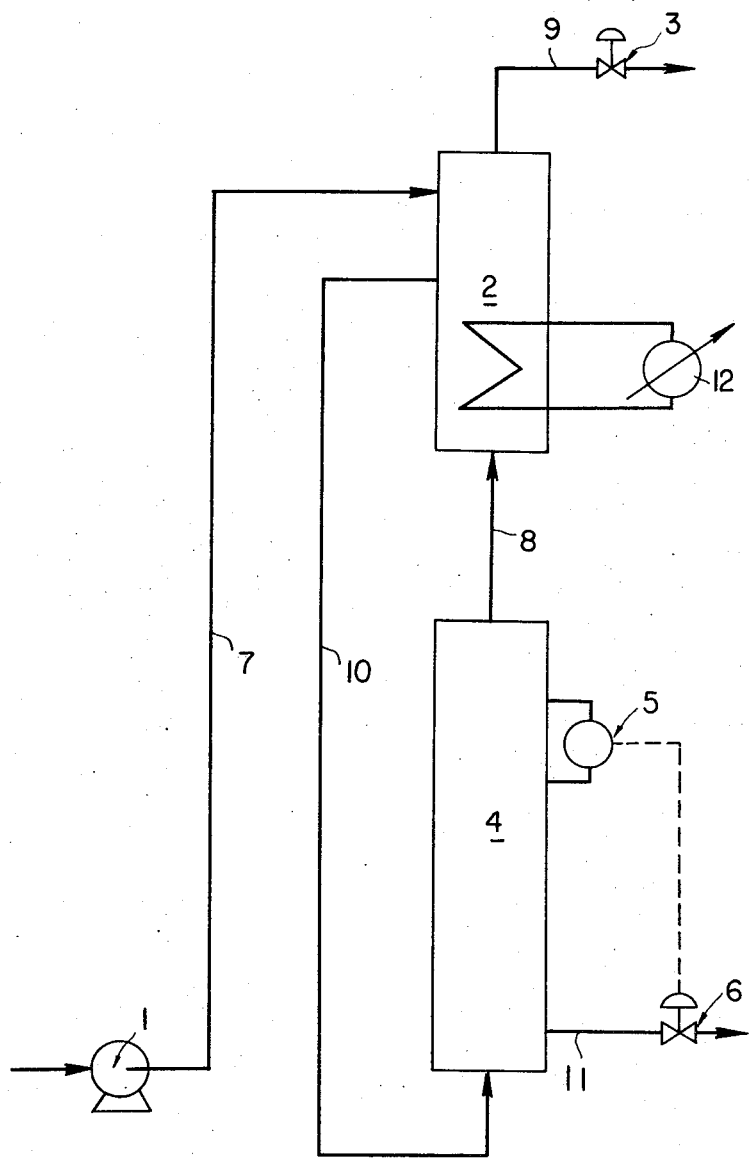

PROCESS FOR RECOVERING BY-PRODUCT GASES AT HIGH PRESSURE IN MELAMINE PRODUCTION

SUMMARY OF THE INVENTION

The present invention relates to a process for recovering under advantageous conditions the by-product gases formed during the production of melamine from urea or its derivatives.

It is known that when urea or its derivatives is reacted under high-temperature and high-pressure conditions in the presence or absence of ammonia, melamine is formed, and at the same time great quantities of gases composed mainly of ammonia and carbon dioxide are obtained as by-products.

In the industrial production of melamine, continuous treatment of these by-product gases, through separation on a large scale, is a very important problem and it would not be an overstatement to say that success in the efficient, industrial production of melamine is dependent on the treatment of the by-product gases. Up to this time there has been no effective process for fully utilizing these by-product gases commercially. These gases may, for instance, be removed together with melamine in a normal pressure system, and after separating the melamine by solidification, they can be used to form ammonium carbonate, ammonium bicarbonate, sodium carbonate or sodium bicarbonate; or only the ammonia may be utilized to form ammonium sulfate or nitric acid. In this manner, however, the high-temperature and high-pressure energies of the by-product gases will be totally lost. Besides, facilities for treating and refining the by-product gases may be needed, and the form of the product makes the use of these processes undesirable. Meanwhile, many proposals have been made to recover these by-product gases under low pressure and use them as raw materials for urea production. In view of the composition of the by-product gases and the similarity between melamine production and urea production, these may be considered reasonable processes for utilizing the by-product gases of melamine production. But according to the conventionally proposed process, by-product gases separated from melamine by solidification of the latter are absorbed in great quantities of water and then recovered under low pressure as a diluted carbamate solution. Therefore the high energy of the by-product gases is practically wasted and great quantities of water are added to the urea-synthesizing system, which is unfavorable to urea synthesis.

Japanese patent publication SHO 40–12911 (1964) discloses a proposal to separate the by-product gases from melamine under high-temperature and high-pressure conditions and combine these gases with urea. However, this is a special process for effecting melamine reaction in a heat-resistant oil and is scarcely practical on a commercial scale. In the methods of synthesizing melamine disclosed in Japanese patent publication SHO 39–1446 (1964) and SHO 40–19118, (1965) which comprise separating the liquid phase of melamine from the by-product gases under high-temperature and high-pressure conditions, it may seem possible to utilize the by-product gases directly as materials for urea production, but since much melamine vapor accompanies these gases and invades the urea system, the urea synthesis is adversely affected. Of course this is undesirable. Moreover, the universal availability of the urea produced will be forfeited in case the melamine vapor happens to blend into said urea.

On the other hand, in the conventional high pressure synthesis of melamine, ammonia has been added to assure uniform blending of the synthetic liquid in the reactor, to prevent deposition and clogging, to stabilize the liquid melamine and at the same time to promote the smoothness of the melamine-forming reaction. In spite of numerous attempts to recirculate by-product gases to the reactor to improve the efficiency of the reaction, it is so difficult as to be practically impossible for the present technology to compress to high pressures this by-product mixture of ammonia, carbon dioxide and other accompanying substances (to be described later) in a gaseous form. The enormous power needed to compress the gases also renders this approach economically impractical.

The primary object of this invention is to provide a reasonable, simple, economical process for recovering the by-product gases formed during melamine production as materials for urea synthesis. Another object of this invention is to provide a process for dissolving a portion of the by-product gases in the molten urea (to be described later) and recirculating them to the melamine reactor.

In particular, the object of this invention is to separate the molten material composed mainly of melamine as formed in the pressurized reactor (hereinafter to be called crude liquid melamine) from the gases composed mainly of ammonia and carbon dioxide (hereinafter to be called by-product gases) under nearly the same conditions as prevail in said reactor and to recover said gases as pressurized by-product gases in the process of producing melamine by the thermal decomposition of urea. This is accomplished by bringing the by-product gases into close contact with the molten urea or a molten mixture of urea and the products of the thermal decomposition of urea (hereinafter to be called "molten urea"), said molten urea being held at a temperature of over 135° and below 250° C and under the same pressure conditions as in said reactor, and thereby recovering the by-product gases with a high retention of energy as materials for urea synthesis. At the same time the molten urea is utilized for washing the by-product gases to recover materials for melamine synthesis.

As explained below, the present invention has been developed by studying the composition and properties of the by-product gases separated under high-temperature and high-pressure conditions, and the gas liquid equilibrium between molten urea and by-product gases under said conditions.

Specifically when the by-product gases are separated from crude liquid melamine in an attempt at the recovery of high-energy by-product gases under nearly identical conditions to those in melamine synthesis, depending on the separating conditions, considerable quantities of melamine and similar substances go into gaseous phase as shown in Table 1, and are entrained by the by-product gases. The weight percent in Table 1 is expressed as a ratio of the melamine content in the by-product gases to the total amount of melamine formed when a melamine-forming reaction was caused to take place with urea and ammonia in a weight ratio of 1 : 0.5 supplied to the melamine reactor. Under the conditions specified in Table 1 the by-product gases were separated from the crude liquid melamine and their composition was measured. Table 2 shows the proportions of melamine and other constituents associated with the ammonia and carbon dioxide of the by-product gases.

TABLE 1

| separation temperature of by-product gases → | 360°C | 400°C |
| --- | --- | --- |
| separation pressure of ↓ by-product gases | Weight % | Weight % |
| 80 (kg/cm$^2$) | 9.62 | 21.30 |
| 100 (kg/cm$^2$) | 8.55 | 18.90 |
| 150 (kg/cm$^2$) | 7.70 | 17.20 |
| 200 (kg/cm$^2$) | 7.25 | 15.80 |

TABLE 2

| Accompanying substances | Proportions |
| --- | --- |
| Melamine | 93.21 (weight %) |
| Urea | 5.19 (weight %) |
| Ureidomelamine | 0.32 (weight %) |
| Melam | 0.25 (weight %) |
| Others | 1.03 (weight %) |

It is evident from these tables that if, for instance, we try to utilize the by-product gases at high energy as materials for urea synthesis by effecting a gas-liquid separation under the usual conditions for melamine synthesis, say, 400° C and 100 kg/cm$^2$, about 18.9 (weight) percent of the melamine formed will go into the gaseous phase and become associated with the ammonia and carbon dioxide, to be accumulated in the urea synthesizing system or mixed with the urea produced. Thus, the substances mainly composed of melamine (Table 2), which accompany the by-product gases, will not only adulterate the urea, but also adversely affect the process of urea production, and in extreme cases they may block the flow. If the by-product gases are recovered as they are at high-temperature and high-pressure, and the ammonia and carbon dioxide are utilized at high energy as materials for urea formation, the gaseous substances accompanying the by-product gases will, as stated above, amount to as much as about 7–20 percent of the melamine formed, and accordingly they will be eliminated from the melamine-synthesizing system with the by-product gases. As a result, the total yield of the melamine synthesis will drop and the economic advantage of the process will be nullified, even though the object of high energy recovery of by-product gases may be attained.

It is for this reason that there is a strong demand for the development of any practical process for separating from the by-product gases those substances mainly composed of melamine, while a high pressure is retained. The process disclosed by this invention specifically meets this demand and can solve the above-mentioned problems.

When the by-product gases which consist mainly of ammonia and carbon dioxide and contain the accompanying substances listed in Table 2 are held under pressure in close contact with the molten urea, the substances accompanying the by-product gases, which consist mainly of melamine, together with part of the ammonia and carbon dioxide, can practically all be recovered as a liquid or fine suspension so long as the operating conditions of this invention are observed.

In operating the washing tower, it is desirable that the urea for washing the by-product gases be supplied at as low temperature as possible (close to the melting point). But the by-product gases which come into contact with the urea are nearly as hot as in melamine synthesis (350°–450° C). Consequently part of the urea is decomposed. As a matter of fact, the liquid within the washing tower contains the products of urea decomposition such as biuret, triuret, cyanuric acid, ammeline, ammelide, melamine cyanurate, in addition to the substances accompanying the by-product gases. However, the washing effect will never be decreased so long as the flow condition within the tower is maintained. Moreover, the molten urea can be recirculated to the melamine-forming reaction zone to be completely turned into melamine, thus successfully averting the loss of melamine.

The washing tower should be operated at a pressure nearly equal to the pressure for melamine synthesis or to the pressure required to separate by-product gases from crude liquid melamine, i.e., a pressure in the range of 50 kg/cm$^2$ – 200 kg/cm$^2$; and the temperature should be chosen in the range from about 135° C — which is the melting point of urea — to 250° C. If the operation is carried out at over 250° C, thermal decomposition of urea will quickly take place, resulting in the formation and precipitation of cyanuric acid, ammelide, ammeline, etc., and in a remarkable decrease in the fluidity of the molten urea for washing the by-product gases. This will make the recovery of the molten urea and its circulation to the melamine reactor impossible. On the other hand, at elevated temperatures, urea, too, will partially shift to the gaseous phase as cyanic acid, ammonium cyanate, or isocyanic acid, which will in great quantities infiltrate again as urea-forming substances into the ammonia and carbon dioxide of the by-product gases, and this is not desirable. At low temperatures less than 130° C, urea itself will be cyrstallized and lose the washing effect.

Such being the nature of the by-product gases, the operating conditions must be within the temperature and pressure conditions mentioned above and the temperature should preferably be above the liquefaction temperature for the by-product gases.

The substances accompanying the by-product gases, consisting mainly of melamine, which are introduced into the washing tower are immediately condensed and solidified in said tower, to be picked up by the molten urea. The sensible heat of the by-product gases and the heat resulting from the dissolution of ammonia and carbon dioxide into the molten urea will raise the temperature of the urea introduced into the washing tower; or in some cases, a part of this heat may be eliminated by the cooler in the tower for washing the by-product gases and may be recovered as, say, pressurized steam.

In carrying out the process according to this invention, the method and apparatus for contacting the molten urea with the by-product gases, and the method and apparatus for charging and discharging the by-product gases and urea may be conventional. The washing tower can be any apparatus commonly used for the purpose of absorption or dust-removal, for instance, a spray tower, a perforated plate tower, a bubble cap tower, the packed column, or a bubble tower, and the sedimentation column can be used singly or in selective combination. For the purpose of cooling the by-product gases and efficiently solidifying and dissolving the accompanying substances, a venturi jet-scrubber or the like may be used. However, in the practical design of the washing tower which is to be operated under conditions of high pressure and corrosive atmosphere with highly viscous molten urea, the structure must be as simple as possible but with full attention paid to corrosion and clogging.

The speed of the by-product gases within the washing tower must be one-fifth to one-fiftieth of the speed usually calculated for atmospheric pressure, considering the high density gas accompanying the urea mist.

In the present invention, spray towers, perforated plate towers, or bubble towers are especially satisfactory for use as the washing tower.

Various methods of carrying out the present invention may be used, but a simple one will now be described with reference to the attached drawing which diagrammatically illustrates one suitable arrangement.

Using the pump 1, the molten urea is pressurized to about the melamine-synthesis pressure and sprayed through the top of a spray-type by-product gases washing tower 2, which is equipped with a heat-recovery apparatus 12. The internal pressure in said tower is controlled by the regulating valve 3. The liquid level in the melamine reactor 4 is maintained constant by means of the liquid level gauge 5 and the regulating valve 6. The by-product gases separated from the crude liquid melamine pass through the duct 8 into the washing tower 2 and meet the counter-stream of urea spray, and are thus separated from the substances (mainly melamine) which accompany said gases. The gases then pass through the duct 9, to be recovered as urea-forming materials at high pressure. The molten urea which contains the substances accompanying the by-product gases is collected at the bottom of the washing tower 2, with ammonia and carbon dioxide contents equivalent to the equilibrium dissolution in the operating condition, and said molten urea is drained by gravity through the descending pipe 10 to said melamine reactor 4. The liquid level in the washing tower is maintained constant by the overflow into the descending pipe 10, while the temperature is kept at a certain level by the heat-recovery apparatus 12.

The crude liquid melamine formed in the melamine reactor 4 has its level regulated by the liquid level gauge 5 and the regulating valve 6 and passes via the duct 11 to the next stage (not shown).

Example:

In the arrangement illustrated in the attached drawing 288 kg/hr of molten urea at 135° C was continuously and uniformly charged and sprayed through the spray nozzle at the top of the by-product gases washing tower, which was kept at 180° C and 100 kg/cm². This tower was a stainless steel pressure vessel of 100 l. capacity equipped near the top with a spray nozzle for the molten urea and further up with a guard-plate for protection against the splash of urea mist accompanied with the by-product gases. At the center of the bottom of the washing tower there was the inlet pipe for the by-product gases. The descending pipe for draining the molten urea kept the liquid level in the washing tower constant at one-third of its height above the bottom. Meanwhile, the melamine reactor was operated at 400° C and 100 kg/cm² and the by-product gases were produced at 285 kg/hr. These gases contain 5.7 percent of other substances, mainly melamine. The by-product gases were separated at high-temperature and high-pressure from the crude liquid melamine at the top of the reactor and were introduced into the lower part of the washing tower, where the by-product gases bubbled up through the molten urea. In the course of this rising movement, they were blended and cooled and the greater part of the accompanying substances was caught and dissolved into the molten urea. Thus some ammonia and carbon dioxide was dissolved. Moreover, in the upper two-thirds of the washing tower the by-product gases came into contact with a counter-stream of urea spray and after passing through the guard-plate, they were recovered at high pressure. Thus, the substances accompanying the by-product gases were almost completely removed, and about 189 kg/hr of by-product gases containing about 1 percent urea and a trace, i.e., about 0.2 percent of said accompanying substances, left unseparated, was introduced into the urea-forming system.

To further ascertain the effect of the by-product gases washing tower and the amount of dissolved gases circulated to the melamine reactor, part of the molten urea at the entrance to the melamine reactor was collected at high pressure, rapidly cooled and then analyzed. The results of this analysis showed melamine 4.2 percent ammonia 10.5 percent, carbon dioxide 10.9 percent, urea and others 74.5 percent. Thus, the melamine recovery rate at the washing tower turned out to be 97 percent, which means that the recovered melamine was wholly recirculated to the melamine reactor.

The quantities of ammonia and carbon dioxide which were dissolved in the molten urea and recirculated were respectively about 40.5 kg/hr and 42.6 kg/hr, which corresponded to the quantity of ammonia, 57 kg/hr, which was conventionally added for the purpose of agitating the contents of the melamine reactor or stabilizing melamine. Thus, stable operation could be carried out without delivering a fresh supply of ammonia to the melamine reactor. Meanwhile, about 98 kg/hr of crude liquid melamine was synthesized in the melamine reactor and sent to the refining stage. This means that the washing tower increased the yield of the synthesis up to 97.5 percent against the 84.3 percent which would result if the by-product gases-washing tower had not been utilized, for in that case about 16.1 kg/hr of melamine would be discharged out of the reaction system. Moreover, the quality of the discharged melamine was in no way inferior to that of the conventional product. On the other hand, 5 kg/cm² of steam was recovered from the cooling apparatus of the washing tower at a rate of 0.2 ton/hr.

What is claimed is:

1. In a process of producing melamine and high temperature by-product gases free of entrained melamine by the thermal decomposition of urea and its derivatives in a pressurized melamine forming reactor, whereby by-product gases are formed in said reactor which are composed mainly of ammonia, carbon dioxide and some of the accompanying entrained substances mainly composed of melamine under approximately the same temperature and pressure conditions in said melamine forming reactor, the improvement of separating the by-product gases and the accompanying entrained substances by bringing the said by-product gases and said accompanying entrained substances into close contact with molten urea held at a temperature between 135° and 250° C and at a pressure substantially the same as that of the melamine forming reactor between 50 kg/cm$^2$ and 200 kg/cm$^2$ to remove said accompanying entrained substances from said by-product gases.

2. The process of claim 1, in which said molten urea containing said accompanying entrained substances and dissolved by-product gases are fed into said melamine forming reactor.

3. The process of claim 1, in which said separated by-product gases are passed to a urea forming system.

4. The process of claim 1, in which said molten urea is contacted under counter-current flow conditions with said by-product gases and said accompanying entrained substances in a wash tower.

5. The process of claim 4, in which said molten urea is sprayed through the top of said wash tower and passes downward through the by-product gas mixture which rise from the lower portion of said wash tower.

6. The process of claim 1, in which a portion of the heat from said by-product gases is used to produce steam.

7. A process of separating entrained melamine from an ammonia and carbon dioxide gas mixture at a pressure of 50 kg/cm$^2$ to 200 kg/cm$^2$ and a temperature of 350°–450° C comprising contacting said gas mixture with molten urea held at a temperature between 135° and 250° C and at a pressure between 50 kg/cm$^2$ and 200 kg/cm$^2$ to remove said entrained melamine.

8. The process of claim 7, in which said entrained melamine gas mixture also contains entrained urea, ureidomelamine and melam.

* * * * *